United States Patent Office 3,738,934
Patented June 12, 1973

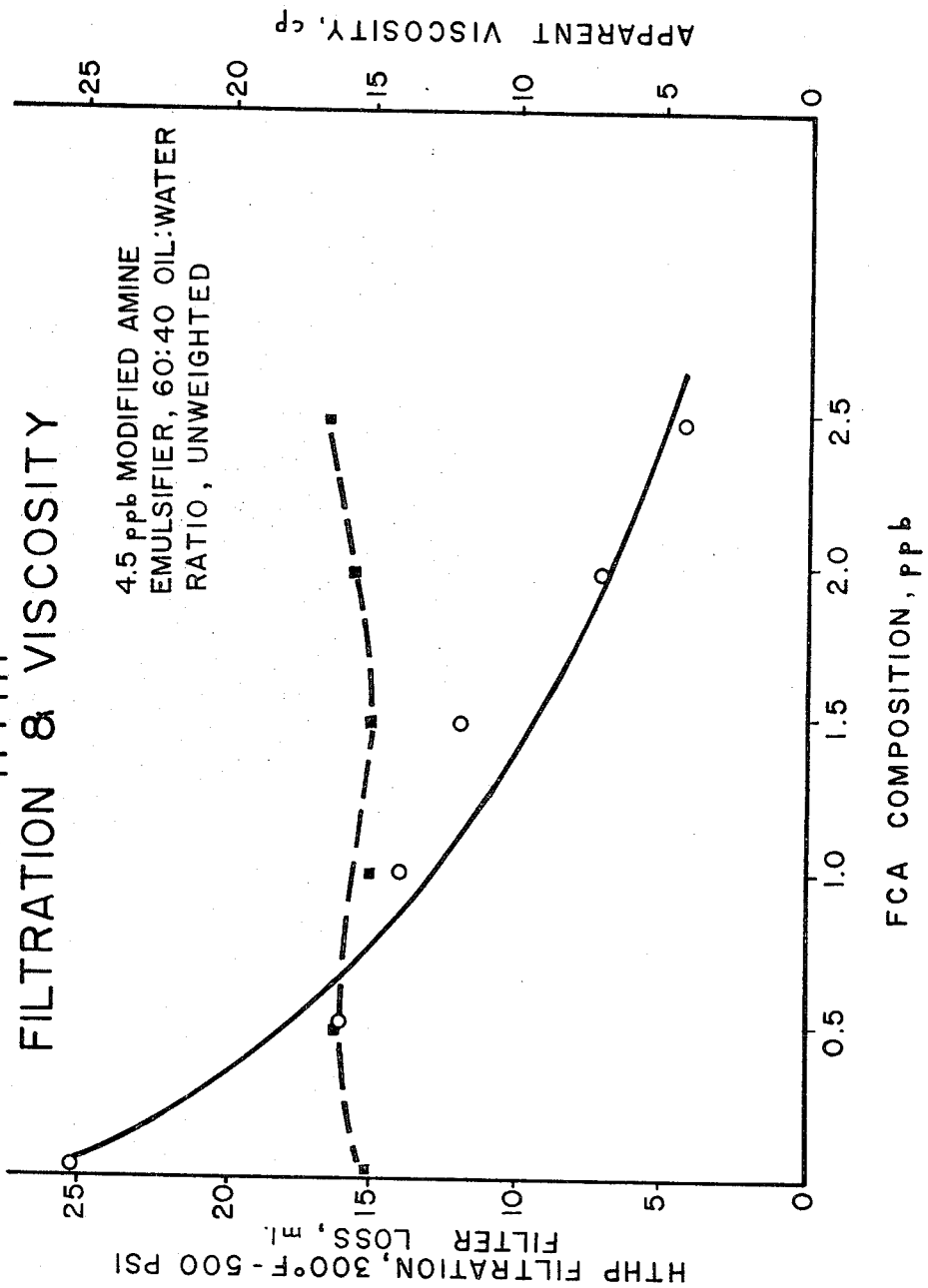

3,738,934
OIL BASE DRILLING FLUID COMPOSITION
AND PROCESS
William C. Browning and Billy G. Chesser, Houston, and Jerry L. Wood, Cypress, Tex., assignors to Milchem Incorporated, Houston, Tex.
Continuation-in-part of abandoned application Ser. No. 857,384, Sept. 12, 1969. This application June 17, 1971, Ser. No. 153,985
Int. Cl. C10m 1/28
U.S. Cl. 252—8.5 P                8 Claims

ABSTRACT OF THE DISCLOSURE

This invention relates to an oil base drilling fluid composition, additive, and filter cake which is effective at high temperatures and pressures and which is easily and econominacally formed by dispersing particles of an oil and water insoluble vinyl toluene-acrylate copolymer resin which is obtained by reacting (a) vinyl toluene, with (b) an acrylate moiety, selected from the class consisting of methyl, ethyl, 2-ethyl-hexyl, butyl, dodecyl acrylates, and methacrylates, in a water-in-oil emulsion. In a preferred embodiment lignite, including mined lignite, oleophilic lignite or mixtures thereof, together with said copolymer resin has particular utility for high temperature drilling conditions.

CROSS REFERENCE TO RELATED APPLICATION

The present application is a continuation-in-part of our copending application Ser. No. 857,384, filed Sept. 12, 1969, now abandoned.

BACKGROUND OF THE INVENTION

(A) Field of the invention

It is generally agreed among those skilled in the art that a rotary system is the most acceptable form of drilling oil and gas wells. This system depends upon the rotation of a column of drill pipe to the bottom of which is attached a multipronged drilling bit. The bit cuts into the earth causing the cuttings to accumulate as drilling continues. As a result, a drilling fluid must be used to carry these cuttings to the surface for removal, thus allowing the bit to continue functioning and the bottom hole to be kept clean and free of cuttings at all times. Drilling systems other than the rotary system are sometimes employed in drilling operations. Nevertheless, these systems still require a drilling fluid to remove borehole cutting and to otherwise perform functions related to drilling fluids.

Oil-producing formations are generally porous layers having varying degrees of permeability to the flow of fluids such as oil, water, or gas. Consequently, the rate of oil production from an oil well is largely determined by the rate of flow of oil through these permeable formations which in turn is dependent upon the porosity or permeability of the sand or stone present. In drilling through such a porous layer, it is desirable to employ a drilling mud having such characteristics that excessive amounts of liquids or solids are prevented from penetrating the porous formation. The ability of a drilling mud to prevent excessive formation fluid penetration is called filtration control.

(B) Description of the prior art

Materials that have been used in the past to control filtration rates of oil phase drilling fluids by plugging, producing cakes, or other similar methods, have included blown asphalt, calcium carbonate, heavy metal rosinates, lignite, and mixtures comprising lignosulfonate and kaolin. These materials each have certain limitations that make it difficult to maintain control of filtration rates at both low and high temperatures and pressures. For example, blown asphalt can only be used in a narrow cut of oil. If the aromatic content is too high the asphalt softens too much and may even be dissolved by the other drilling fluid components. If the aromatic content is too low, the asphalt tends to flocculate, thus having an adverse effect on viscosity. When used at relatively high temperatures, a highly oxidized and, therefore, a hard asphalt particle must be used to counteract the softening of the asphalt at these high temperatures. However, the addition of such a hard particle is not satisfactory at low temperatures because it is not flexible enough to form a compressible and highly impermeable cake which is necessary for effective filtration control. Thus, blown asphalt alone regardless of degree of oxidation will not function properly at both low and high temperatures. It is not possible to satisfactorily use this material alone in drilling operations which will encounter both high and low temperatures before drilling is completed.

The soap class of materials such as calcium stearate soaps and heavy metal rosinates are satisfactory at low and moderate temperatures but go into an undesirable solution at higher temperatures. Their use is generally limited to temperatures of less than 300° F.

Lignite and lignosulfonate and kaolin additives are inflexible and hard. This feature will provide filtration control under non-critical conditions. However, where extremely close control of filtration is required when drilling through highly sensitive formations, a better seal of the formation pores must be provided.

Water soluble or colloidally dispersable hydrocarbon substituted styrenes, such as alpha methyl styrene, para methyl styrene, 2-4 dimethyl styrene and the like, have been copolymerized with acrylic and methacrylic derivatives for use in drilling fluids. For example, Oldham et al., U.S. Pat. No. 2,718,497, teaches the use of these relatively high molecular weight polymers to control water loss characteristics of aqueous muds and clay dispersions. Fordyce et al., U.S. Pat. No. 2,650,905, teaches the use of water soluble sulfonated polystyrene derivatives for filtration control in water base drilling fluids. Oil soluble sulfonated polystyrene derivatives are taught by Fordyce, by modification, by alkylation, or through neutralization of the polystyrene sulfonic acids with amines and tertiary amines having a long chain aliphatic substituent on the amino nitrogen.

In all of the prior art uses of polymers and copolymers for filter loss control, it has been the object of the art to provide a dissolved large molecule or a colloidally dispersed molecule in the drilling fluid to alter the fluid loss characteristics of the fluid. It is the discovery of the present invention that a novel improved filtration control agency may be provided by dispersing insoluble particulate vinyl toluene-acrylate copolymer resin having about 1.65-to-1.00 weight ratio of acrylate to vinyl toluene in a water-in-oil emulsion. This filtration control agent has the property of absorbing oil with resultant swelling. When the thus modified drilling fluid is used in the well bore, the swollen resin material produces a gel-like filter cake along the borehole to maintain effective filtration control at high temperatures.

SUMMARY OF THE INVENTION

The present invention provides a filter cake-producing substance which is effective at high temperatures through utilization of a vinyl toluene-acrylate copolymer resin in such a manner so that the product produced readily absorbs oil and will swell to many times the original size of the particles. Although not fullly understood, we have found that satisfactory oil absorption and swelling of the particles results when the acrylate-to-vinyl toluene ratio is at least about 1.65-to-1.0 by weight. By the further addition of a lignite substance, filtration control can be greatly enhanced at elevated borehole temperatures above 450° F.

It is an object of this invention to provide a material that will form a soft deformable filtration cake-producing agent that will swell when dispersed in a water-in-oil emulsion.

It is also an object of this invention to provide a filter cake which is substantially unaffected by high borehole temperatures.

It is a further object of this invention to provide a filter cake which is effective at both high temperatures and low temperatures.

It is still a further object of this invention to provide a filtration control agent which will not materially affect the viscosity of the utilized drilling fluid system.

Other objects and advantages will be realized and appreciated by those skilled in the art from the following description, examples and claims.

BRIEF DESCRIPTION OF THE DRAWING

The single drawing is a graphical representation of data relating to the filtration and viscosity properties of drilling fluids incorporating a composition of this invention.

DESCRIPTION OF THE PREFERRED EMBODIMENTS

An important characteristic of a drilling mud is its ability to form a thin impervious cake on the walls or face of the borehole to seal this surface against fluid flow therethrough. A measure of the ability of a drilling mud to form such a thin impervious layer may be obtained by means of a simple filtration test in which the mud-cake is formed and pressed against the membrane or filter which is permeable to oil and water. We have found that the filtration control compositions of the present invention will produce a filter cake which still retains its effectiveness at temperatures as high as 500° F. Moreover, a drilling fluid containing the filtration control agent of the present invention is not affected when weighted with a high specific gravity material such as barite.

The filtration control agent consists of a modified vinyl toluene-acrylate copolymer resin which is preferably mixed with an oleophilic which may be a lignite such as a mined lignite, mixtures thereof and the like. The vinyl toluene-acrylate copolymer resin is obtained by reacting an aromatic vinyl monomer with an acrylate moiety, such as methyl, ethyl, 2-ethyl-hexyl, butyl, dodecyl acrylates, or methacrylates in accord with well-known polymerization techniques to produce a copolymer of above 200,000 molecular weight. It has been found that the vinyl toluene-acrylate copolymer resin can be prepared in such a manner as to provide an insoluble product with a high capacity for oil absorption. This can be achieved by utilizing a ratio of acrylate-to-vinyl toluene of at least about 1.65-to-1.00, by weight, which is the preferred ratio. When the product contains a lesser amount of acrylate, the desired swelling does not occur in the water-in-oil emulsion. We have found that Pliolite AC–3, manufactured by the Goodyear Tire and Rubber Co., is a satisfactory resin for use in the filter cake of the present invention. This product is commercially available as a powder which can be utilized in the practice of the present invention. The filtration agent will soften and swell to a controlled degree when placed in an oil product such as a crude oil, a topped straight run fraction from any crude, a thermally cracked residuum obtained from any crude, diesel fuel, and/or other hydrocarbon fractions. When dispersed in the oil medium, this product will be in a soft and deformable physical state so that a liquid rivet can be formed at the entrance to a space or well bore opening to give maximum shut-off and filtration control.

The ability of the cake-producing substance to swell by absorbing solutions is of utmost importance and it is this characteristic which permits the filter cake to effectively control filtration loss.

For effective filtration control at temperatures above about 350° F., we prefer to form a filtration control composition by adding a lignite substance to the filtration control agent of the invention. Oil particles are attracted to lignite, thus allowing these substances to form a cake and to alone provide some, although not completely satisfactory filtration control. Various lignites and lignite-containing materials have been found to be satisfactory, but we presently prefer lignite known as North Dakota lignite. When added to the vinyl toluene-acrylate copolymer resin, these substances further enhance filtration control by providing a more effective filter cake in the borehole. In addition, the lignite will not alter high temperature or high pressure effectiveness of the filter cake of the present invention and will, in fact, enhance high temperature effectiveness. Although filtration control can be obtained without use of any lignite material, we have found that when it is desired to be used with the resin, additions of this material in lignite-to-resin ratios as high as 4-to-1 by weight and as low as 1-to-1 by weight will aid in preventing filtration loss. The ratio of lignite-to-resin used will vary and will depend on the selected drilling operation and the various borehole conditions. Generally speaking, when it is deemed desirable to add a lignite-containing substance, about a 1-to-1 ratio is preferred.

The filtration control agent of the present invention can be used in drilling fluids containing any oil or oil by-product that is currently known to those skilled in the drilling fluid art. We have found that kerosene, diesel oil, or any form of crude or refined oil can be used within the scope of the present invention. The exact amount of oil which can be used is not critical and will depend on the specific needs of the selected drilling operation. The preferred range of oil in the entire drilling fluid system used should preferably be between about 60 and 80 parts by volume. By "oil base drilling fluid" we mean a drilling fluid comprising a water-in-oil emulsion where fresh water, salt water, seawater or brines or mixtures thereof is the dispersed phase and diesel, crude, or some other hydrocarbon is the continuous phase. The formation of the drilling fluid emulsion may be accomplished by the use of any techniques and emulsifying agents known to the art. The particular emulsifying agents used, as well as other additives such as gelling agents, are not material to this invention.

It is important to note that the addition of a high amount of oil will result in a thin fluid while the addition of a low amount of oil will produce a fluid of extremely high viscosity. The water-to-oil ratio is economically important because water is less costly. However, increased quantities of water will necessarily effect the amount of barite or other weighting agent that can be later added to the drilling fluid system.

Generally speaking, any type of water can be used as the water phase of the drilling fluid to obtain the filter cake of the present invention. We have found that seawater and fresh water, as well as brackish and saturated brines are equally effective and compatible with the filtration control agent of the present invention. Although an oil phase drilling fluid containing high levels of water can be used with the filtration control agent, we prefer to utilize a drilling fluid containing between about 20 and 40 parts water by volume to the entire drilling fluid content. Use of the preferred range of water will result in a fluid with ideal viscosity characteristics. However, the exact amount of water desired will depend upon the actual requirements of the fluid for the selected drilling operation.

Upon addition to the oil, the vinyl toluene-acrylate copolymer resin will absorb the oil molecules and swell.

The swollen resin particles will form a sticky filter cake along the borehole of the drilled well to prevent loss of fluid. The copolymer resin first slowly imbibes the oil to form a swollen gel. This gel will not disintegrate into a solution upon the application of agitation because of strong hydrogen bonding. The resin will swell to many times its original volume by absorbing the oil with which it comes into contact.

The filtration control agent may be used in the drilling of a well by circulating during drilling an oil base drilling fluid containing the filtration control agent with or without lignite in any amount necessary to obtain the desired filtration control level. Under most drilling conditions, levels between about 1.5 p.p.b. and 3 p.p.b. will be sufficient to form a cake to control filtration loss. A treatment of 7 p.p.b. of a composition of 1:1 ratio filtration control agent and lignite has been sufficient to obtain a satisfactory filtration cake in oil well drilling when critically high temperatures of about 500° F. have been encountered.

It is important to note that the use of the filtration control agent of the present invention will not significantly affect the viscosity of the mud system utilized. For example, we have found that when 1.5 p.p.b. of the filtration control agent was placed in a 60-to-40 oil-to-water ratio drilling fluid which is unweighted, an apparent viscosity reading of 15 cp. was obtained. When 2.5 p.p.b. of the filtration control agent was utilized, the drilling fluid had an apparent viscosity reading of 17 cp.

A measure of the ability of a drilling fluid to form a thin impervious compressible filter cake may be determined by utilization of a simple filtration test in which the filter cake is formed and pressed against the membrane or filter which is permeable to oil and water. A standardized procedure for determining the filtration rate is described in "API Recommended Practice RP13B Standard Procedure for Testing Drilling Fluids," second edition (April 1969). The test which is preferred is the high temperature test which determines fluid loss at 300° F. and 500 p.s.i. differential pressure. However, our filtration cake has been found to be effective at even higher temperatures and, for this reason, we have utilized the API high temperature test procedures but have increased test temperatures to demonstrate the novel and unique ability of the filter cake to effectively function at these higher temperatures. We have found that filtrate loss can be controlled under these critical test conditions to less than about 8.2 ml. of 350° F./500 p.s.i. when the filtration control agent of the present invention is used in concentrations between about 0.1% to about 5.0% by weight of the entire drilling fluid content.

The invention is further described and illustrated by the following examples:

EXAMPLE I

A copolymer resin having a vinyl toluene-to-acrylate ratio of 1.55-to-1.0 is placed into an oil phase drilling fluid. Two hundred ml. of diesel oil is added 3 g. of an amine emulsifier (available as Milchem Incorporated product "Carbo-Tec D"). The emulsifier is further disclosed in Foley et al., U.S. patent application 710,763, filed Mar. 6, 1968 now Pat. No. 3,590,005. In summary, the Foley et al. application states that "in accordance with the present invention, certain emulsifier compositions have been evolved comprising admixtures of (a) condensation reaction products of certain oxidized hydrocarbon waxes and amines and (b) metal salts of oxidized hydrocarbon waxes, which, it has been found, are highly effective for preparing water-in-oil emulsions which are stable at elevated temperatures and in the presence of electrolytes." The abstract of this disclosure is as follows: "Emulsifier compositions comprising admixture of (a) between about 10% and 90% by weight of an oxidized hydrocarbon wax-amine condensation product and (b) between about 90% and 10% of a metal salt of an oxidized hydrocarbon wax, said emulsifier compositions being particularly effective for preparing water-in-oil emulsions that are stable in the presence of electrolytes and at temperatures as high as about 260° C." A representative claim of this invention is "an emulsifier composition comprising an admixture of (a) between about 10% and 90% by weight of an oxidized hydrocarbon wax-amine condensation product, said oxidized hydrocarbon wax-amine condensation product being the product of the reaction of an oxidized hydrocarbon wax and a polyamine, said polyamine being a member of the class consisting of (1) a polyamine having at least one primary and at least one secondary amino group; and (2) a polyamine having two primary amino groups seprated by two or three carbon atoms; and (b) between about 90% and 10% by weight of a metal salt of an oxidized hlydrocarbon wax, said metal selected from at least one member of the group consisting of alkali metals, alkaline earth metals, aluminum, copper, chromium and lead." Briefly stated, a suitable emulsifier can be prepared by mixing together and heating at 150° C. 335 grams of oxidized microcrystalline wax and 90 g. of tetraethylene pentamine. While maintaining a temperature of about 150° C. the reaction is allowed to proceed with agitation under a vacuum of about 26 mm. Hg for 4 hours during which period water evolution will cease and 8.5 cc. of water should be collected. The reaction batch is then allowed to cool to about 110° C. and maintained at that temperature while an additional 350 g. of oxidized microcrystalline wax is added while continuing to agitate the batch. 140 g. of 50% aqueous sodium hydroxide is then slowly added with agitation to the batch of melted wax. About 10 minutes after the sodium hydroxide is completely incorporated, gelation will start to occur, and 210 g. of 30% aqueous calcium chloride should be added while mixing the reaction mass at high speed to insure the formation of a uniform emulsion. The batch mass is then dried, cooled, and ground to powder. One g. of an organophilic bentonite, sometimes referred to for brevity as an oleophilic clay, is then placed into the mixture as a gelling agent. A suitable gelling agent is Milchem Incorporated product known as "Carbo-Gel" which is a blend of paint grade talc and bentonite. One gram of the resin is then added. The fluid is then mechanically agitated.

After agitation, the above prepared fluid was hot rolled for 16 hours at 150° F. The sample was then tested for filter loss through use of the API test method as above described at temperatures of 250° F. and 350° F. The fluid failed to provide any filtration control at either temperature. It was also observed that the resin failed to absorb the solvent and swell.

EXAMPLE II

Two hundred ml. of diesel and 136 ml. of saturated salt water were emulsfiied, using the amine emulsifier of Example I. One gram of oleophilic clay was dispersed in the emulsion. This fluid was tested for filter loss using the API high temperature test as referred to above at 250° F./500 p.s.i. There was no control of filtration because of the failure of the fluid to produce an impervious filter cake.

EXAMPLE III

A sample drilling fluid was prepared as in Example I. However, one gram of a vinyl toluene-acrylate copolymer resin having an acrylate-to-vinyl toluene ratio of 1.65-to-1 was substituted for the 1.55-to-1 resin used in Example I. It was observed that the resin particles swelled when placed in the water-in-oil emulsion. The fluid was then hot rolled as in Example I. A filtration control test using the API test method as above described was performed with the following results:

| Temperature (° F.): | Filter loss, ml. |
|---|---|
| 250 | 15.8 |
| 350 | 26.2 |

It will be observed that the ml. filter loss in this test was higher than those of tests described below. However, in this example, only 2.5 p.p.b. of the filtration control agent was utilized.

EXAMPLE IV

The ability of the filtration control agent to produce a filter cake which can function under medium temperatures and pressures was demonstrated by emulsifying about 200 ml. of disel fuel and 136 ml. of saturated salt water. One gram of oleophilic clay was dispersed in the emulsion. To this base drilling fluid was added approximately 1 p.p.b. (pounds per barrel) of a vinyl toluene-acrylate copolymer resin having a 1.65-to-1.0 acrylate-to-vinyl toluene ratio. This fluid was tested for filtrate loss using the API high temperature test as referred to above. The filter loss at 250° F./500 p.s.i. was 8.6 ml.

EXAMPLE V

Tests were run to determine the filtration loss at 400° F./500 p.s.i. of a drilling mud containing the filtration control agent of the present invention. About 148 ml. of diesel fuel and 63 ml. of saturated salt water were emulsified using 9.0 g. of the modified amine emulsifier. A suspension of 4.0 g. of oleophilic clay was then added followed by an addition of 7 g. of the filtration control agent of the present invention. The filter loss was measured using the API test method as described above at 400° F./500 p.s.i. The filter loss was found to be only 8.8 ml.

EXAMPLE VI

Tests were run to determine the effectiveness of a 5 p.p.b. treatment of a filtration control agent containing various amounts of the filtration control agent and an addition of lignite. Two hundred and ten (210) ml. of diesel fuel were added to 140 ml. tap water and were emulsified using 5 g. of a modified amine emulsifier. Three grams of oleophilic clay was suspended in the fluid followed by the addition of the filtration control agent. Filtration loss of the cake produced was determined at 350° F./500 p.s.i. through use of the API test method as described above. The results of these tests were as follows:

|   |   | Ml. |
|---|---|---|
| (A) | 5.0 p.p.b. lignite, 0.0 p.p.b. FCA* | 18.0 |
| (B) | 4.5 p.p.b. lignite, 0.5 p.p.b. FCA* | 14.8 |
| (C) | 4.0 p.p.b. lignite, 1.0 p.p.b. FCA* | 7.5 |
| (D) | 3.0 p.p.b. lignite, 2.0 p.p.b. FCA* | 5.8 |
| (E) | 2.5 p.p.b. lignite, 2.5 p.p.b. FCA* | 4.4 |
| (F) | 1.0 p.p.b. lignite, 4.0 p.p.b. FCA* | 9.0 |
| (G) | 0.0 p.p.b. lignite, 5.0 p.p.b. FCA* | 9.2 |

*Filtration control agent.

This test indicated that when a filter cake containing only lignite, without the addition of the vinyl toluene-acrylate copolymer resin, a high ml. filtrate loss will occur. When used in about a 3.93-to-1, lignite-to-filtration control agent ratio, as in (C), the ml. filter loss is acceptable. Optimum filtration control can be obtained as above exemplified in (E) when the lignite-to-filtration control agent ratio is about 1.0-to-1.0.

EXAMPLE VII

A drilling fluid was prepared as in Example VI to determine the effectiveness of a filter cake formed by a filtration control composition (FCC) utilizing 1.0 p.p.b. of the filtration control agent with an addition of 4.0 p.p.b. lignite for tests at both high and low temperatures. API filtration tests, as described above, were run at temperatures between 200° F. and 500° F. at 500 p.s.i. with varying concentrations of the filtration control mixture. Results of these tests were as follows:

|   | Temperature, °F. | | | |
|---|---|---|---|---|
|   | 500 | 350 | 300 | 200 |
| Concentration of FCC, p.p.b. | 7 | 5 | 5 | 2.5 |
| Filtration loss, ml. | 8.2 | 7.6 | 7.4 | 5.8 |

As indicated, acceptable filtration control was achieved using 2.5 p.p.b. treatment for 200° F. environments, while 5.0 p.p.b. was needed at temperatures of 300° F. and 350° F. A 7.0 p.p.b. treatment was utilized at 500° F. in order to obtain a filter cake having a filtrate loss below 9.0 ml. which is generally the accepted minimum tolerance.

EXAMPLE VIII

Tests were run to determine the effect of the addition of a weighting agent on the efficiency of the filtration control agent. About 148 ml. of diesel fuel and 63 ml. of saturated calcium chloride were emulsified using 9.0 g. of the amine emulsifier of Example I. To this solution was added 4.0 g. of oleophilic clay. About 5 g. of the filtration control agent of Example III was then added to the system, and the resulting compound was evaluated for filter loss using the API test method as described above.

The filtration loss of this compound was compared to the filtration loss of the same compound which was weighted with about 534 g. of barite treated with 2.5 cc. of an oil-wetting surfactant which was suspended to provide an 18.0 lb./gal. fluid. The results of these tests were as follows:

| Loss at 350° F./500 p.s.i.: | Ml. |
|---|---|
| Unweighted | 8.2 |
| Weighted (18.0 lb./gal.) | 8.8 |

EXAMPLE IX

A drilling fluid was prepared by emulsifying about 210 ml. of diesel fuel and 140 ml. tap water using 7 g. of the modified amine emulsifier. About 3 g. of oleophilic clay was suspended in the fluid. The filtration control composition was prepared in a 4-to-1, lignite-to-filtration control agent ratio in amounts ranging from 0% to 1.43% (0 p.p.b. to 5 p.p.b. equivalent) of the total drilling fluid content. Filtration was measured at 300° F./500 p.s.i. using the API test method as described above. It was found that satisfactory filtration control was obtained when the fluid was treated with as little as 2.5 p.p.b. of the filtration cake-producing agent. The results of this test are stated below:

| Filtration control composition (p.p.b.): | Filtration loss (ml.) |
|---|---|
| 0 | 34.0 |
| 1 | 13.6 |
| 2.5 | 8.4 |
| 5 | 7.4 |

EXAMPLE X

Tests were run to determine the effect on viscosity of an addition of the filtration control composition (50:50 FCC and lignite) of the present invention to a drilling fluid. An unweighted 60-to-40, oil-to-water ratio drilling fluid was made using 4.5 p.p.b. of modified amine emulsifier. To this was added varying p.p.b. levels of the filtration control agent. Apparent viscosity was determined by using a Model 35 Fann Viscometer. The tests results indicated that the effect on viscosity of the filtration control agent is negligible. The results of this test are shown in the attached drawing.

EXAMPLE XI

An oil well was drilled in the East Bastion Bay Field, Plaquemines Parish, Louisiana, using a drilling mud containing the filtration compound of the present invention.

A liqnosulfonate mud system was utilized in the well to a depth of 13,370 feet. The lignosulfonate mud system was then pumped out of the well and a drilling mud containing the filtration composition of the present invention was thereafter circulated during further drilling. The mud system was made using the following per 100 bbl.:

| | | |
|---|---|---|
| Diesel fuel | bbl | 46 |
| Water | bbl | 32 |
| Emulsifier (Carbo-Tec D [1]) | lbs | 350 |
| Liquid emulsifier (sheared) | gal | 55 |
| Time | lbs | 200 |
| Filtration control compound | lbs | 200 |
| Gelling agent (Carbo-Gel [2]) | lbs | 100 |
| Wetting agent (Surf-Cote [3]) | gal | 8 |
| Barite weighting agent (Mil-Bar [4]) | lbs | 31,000 |

[1] Registered trademark of Milchem Incorporated for an amine emulsifier.
[2] Registered trademark of Milchem Incorporated for organophilic bentonite.
[3] Registered trademark of Milchem Incorporated.
[4] Registered trademark of Milchem Incorporated.

Treatment levels of from about 2 p.p.b. to about 3.55 p.p.b. of the filtration control composition containing a 1-to-1 filtration control agent-to-lignite ratio were utilized until the completion of the well at a depth of 13,853 feet.

Samples of the drilling fluid were taken from the flow line and the mud pit from time to time during drilling operations and were tested for filter loss using the API test method as described above at 300° F./500 p.s.i. The filter loss ranged from a low of 0.8 ml. to a high of 2.0 ml. This extremely low filter loss is presently attributed to the fact that the filtration control compound functions better under actual drilling conditions because of extreme shear caused by the mud pump, the turbulent mud flow in the well, and other causes which are impossible to simulate in laboratory-prepared fluids.

The amount of the filtration control agent or composition of this invention which will be required for effective filtration control will vary with differences in drilling fluid composition and the temperatures encountered wthin a particular well. Pilot tests may be conducted under the temperature conditions of a particular well with the drilling fluid used therein to determine the amount of the agent or composition required for effective filtration control. Such tests may be conducted with different quantities of agent or composition to determine the least amount required for any predetermined acceptable fluid loss (usually 9.0 ml. loss under the test conditions described in the above examples is required, but a higher or lower limit may be used if desired).

It will be noted that in some of the examples clay was added to the drilling fluid. The use of clay as an ingredient for the formation of a filter cake is optional in the practice of the present invention as well as the use of other known additives to the drilling fluid. In the claims and the specification, reference to "p.p.b." is to pounds per 42 gallon barrel.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What we claim is:

1. An oil base drilling fluid consisting essentially of (1) a water-in-oil emulsion, (2) at least about 1.5 p.p.b. of an oil absorbing insoluble vinyl toluene-acrylate copolymer resin which is obtained by reacting (a) vinyl toluene with (b) an acrylate moiety selected from the class consisting of methyl, ethyl, 2-ethylhexyl, butyl, dodecyl acrylates and methacrylates, the weight ratio of said acrylate to vinyl toluene being at least about 1.65-to-1, the molecular weight of said resin being at least about 200,000 and (3) a water-in-oil emulsifier.

2. The drilling fluid of claim 1 with the further admixture thereto of lignite in a lignite-to-resin ratio of from about 4-to-1 by weight to about 1-to-1 by weight.

3. The drilling fluid of claim 2 wherein the ratio of lignite-to-resin is about 1-to-1 by weight.

4. In a method of drilling a well into subsurface formations in which in invert oil base drilling fluid having present therein a water-in-oil emulsifier is circulated into the well, the method of forming a filter cake on the wall of the well to decrease loss of fluid from the drilling fluid which comprises admixing with said drilling fluid an amount of at least about 1.5 p.p.b. of an oil absorbing insoluble vinyl toluene-acrylate copolymer resin which is obtained by reacting (a) vinyl toluene with (b) an acrylate moiety selected from the class consisting of methyl, ethyl, 2-ethyl-hexyl, butyl, dodecyl acrylates and methacrylates, the weight ratio of said acrylate-to-vinyl toluene being at least about 1.65-to-1, the molecular weight of said resin being at least about 200,000, whereby the resin will swell and absorb oil, and circulating said drilling fluid in said well.

5. The method of clam 4 in which lignite is additionally added to said resin in a lignite-to-resin ratio of from about 4-to-1 by weight to about 1-to-1 by weight.

6. A filtration control agent for oil base drilling fluids having present therein an emulsifier, said agent consisting essentially of (1) at least about 1.5 p.p.b. of an oil absorbing insoluble vinyl toluene-acrylate copolymer resin which is obtained by reacting (a) vinyl toluene with (b) an acrylate moiety selected from the class consisting of methyl, ethyl, 2-ethyl-hexyl, butyl, dodecyl acrylates and methacrylates, the weight ratio of said acrylate to vinyl toluene being at least about 1.65-to-1, the molecular weight of said resin being at least about 200,000, and (2) lignite in a lignite-to-resin ratio of from about 4-to-1 by weight to about 1-to-1 by weight.

7. The filtration control agent of claim 6 wherein the ratio of resin to lignite is about 1-to-1 by weight.

8. The filtration control agent of claim 6 wherein the ratio of lignite-to-resin is about 4-to-1.

References Cited

UNITED STATES PATENTS

| | | | |
|---|---|---|---|
| 2,743,233 | 4/1956 | Fisher | 252—8.5 |
| 2,650,905 | 9/1953 | Fordyce et al. | 252—8.5 |
| 2,876,197 | 3/1959 | Watkins | 252—8.5 |
| 2,989,517 | 6/1961 | Hanson et al. | 260—86.7 X |
| 3,008,937 | 11/1961 | Ruffing et al. | 260—86.7 |
| 3,046,222 | 7/1962 | Phansalkar et al. | 252—8.55 |
| 3,590,005 | 6/1971 | Foley et al. | 252—308 |

HERBERT B. GUYNN, Primary Examiner

U.S. Cl. X.R.

260—86.7